(12) United States Patent
Girotto

(10) Patent No.: US 11,273,678 B2
(45) Date of Patent: Mar. 15, 2022

(54) TRACTION AND SUSPENSION SYSTEM

(71) Applicant: TEXA DYNAMICS S.R.L., Monastier di Treviso (IT)

(72) Inventor: Adriano Girotto, Treviso (IT)

(73) Assignee: TEXA DYNAMICS S.R.L., Monastier di Treviso (IT)

( * ) Notice: Subject to any disclaimer, the term of this patent is extended or adjusted under 35 U.S.C. 154(b) by 50 days.

(21) Appl. No.: 16/625,836

(22) PCT Filed: Jun. 11, 2018

(86) PCT No.: PCT/IB2018/054207
§ 371 (c)(1),
(2) Date: Dec. 23, 2019

(87) PCT Pub. No.: WO2018/234923
PCT Pub. Date: Dec. 27, 2018

(65) Prior Publication Data
US 2020/0307330 A1    Oct. 1, 2020

(30) Foreign Application Priority Data

Jun. 23, 2017 (IT) .......................... 102017000070192

(51) Int. Cl.
*B60G 3/20* (2006.01)
*B60K 7/00* (2006.01)

(52) U.S. Cl.
CPC .............. *B60G 3/20* (2013.01); *B60K 7/0007* (2013.01); *B60G 2200/18* (2013.01); *B60G 2202/25* (2013.01); *B60G 2204/421* (2013.01); *B60G 2206/10* (2013.01); *B60G 2300/50* (2013.01)

(58) Field of Classification Search
CPC .. B60G 3/20; B60G 2200/18; B60G 2202/25; B60G 2204/421; B60G 2206/10; B60G 2300/50; B60G 2400/822; B60G 2800/21; B60G 2800/214; B60G 2800/95; B60K 7/0007

See application file for complete search history.

(56) References Cited

U.S. PATENT DOCUMENTS

| 10,486,524 | B2 * | 11/2019 | Girotto | ................ H02K 16/00 |
| 2004/0094928 | A1 * | 5/2004 | Amanuma | ........... B60K 17/356 |
| | | | | 280/124.125 |
| 2020/0369279 | A1 * | 11/2020 | Girotto | ............. B60W 30/1819 |

FOREIGN PATENT DOCUMENTS

| DE | 102010023985 A1 * | 8/2011 | ............... B60G 3/20 |
| DE | 102015008586 A1 | 1/2017 | |
| EP | 1892138 A1 | 2/2008 | |
| FR | 2962375 A1 | 1/2012 | |

(Continued)

*Primary Examiner* — Jonathan Ng
*Assistant Examiner* — Scott F. Underwood
(74) *Attorney, Agent, or Firm* — Mark M. Friedman

(57) ABSTRACT

The device has an electrical traction machine (20) suspended to a body of a hybrid or electric motorization vehicle and providing engine torque (CM) applied to rear wheels (3, 4). A mechanical link is provided between the machine and a deformable crossmember (2) to transmit torque effect (CR) with the engine torque to the crossmember for descending the rear wheels with respect to the body of the vehicle and for creating anti-squat effect during acceleration in electric propulsion of the vehicle. The link is provided with a connection shaft (30) connected to two levers (21, 33).

14 Claims, 1 Drawing Sheet

(56) References Cited

FOREIGN PATENT DOCUMENTS

| JP | 59167129 A | * | 9/1984 | ................ B61L 3/08 |
| WO | WO-2004101304 A1 | * | 11/2004 | ........... B60K 7/0007 |
| WO | WO-2011003489 A1 | * | 1/2011 | ........... B60K 7/0007 |
| WO | WO-2014023302 A1 | * | 2/2014 | ........... B60K 7/0007 |
| WO | WO-2015155670 A1 | * | 10/2015 | ........... B60K 7/0007 |
| WO | WO-2019116198 A1 | * | 6/2019 | ............... B60K 1/02 |

* cited by examiner

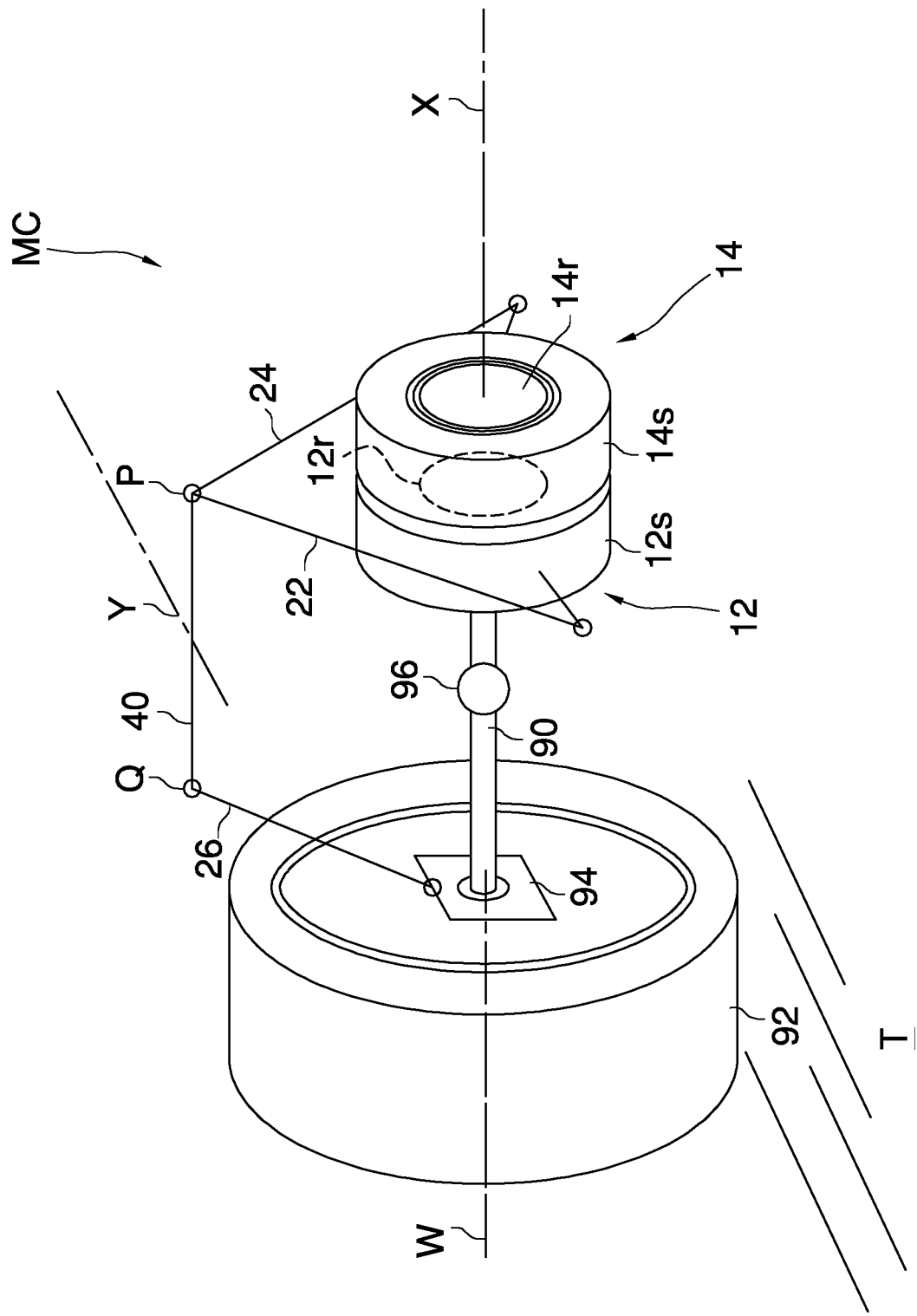

TRACTION AND SUSPENSION SYSTEM

The invention refers—in general—to a traction and suspension system, in particular in electric vehicles.

In the latest generation of electric vehicles, traction has been moved directly into the wheels, consequently the weight of the wheel is increased (at about 30 kg) while that of the overall vehicle can be even lower. Because the elastic force of the suspension is about the weight of the vehicle divided by the number of wheels, the dynamic behaviour of the wheel is less controlled because the suspension must act on a bigger mass. Some manufacturers regain stability by adding a linear actuator in parallel to—or in place of—the suspension, but it seems inadequate to solve the problem by increasing complexity (especially in the control) when the initial goal was and will always be to reduce it.

A different solution is presented in WO2015155670, which, thanks to two electric motors controlled independently of each other, not only teaches how to give a wheel propulsive torque to but manages to vary the distance thereof from the vehicle frame. WO2015155670 describes as specific example a motorized wheel for vehicle. In some applications it is preferable to leave the wheels idle and install the electric motors on the frame, e.g. to simplify the construction of the vehicle or to convert one with electric propulsion means. Therefore, it would be needed to develop an embodiment of WO2015155670 for this case. Furthermore, the system in WO2015155670 exhibits difficulties if one wishes to integrate it into existing frame structures.

It is therefore proposed a development of WO2015155670 to overcome to one or more of these problems, with a system and/or method as in the attached claims, in which the dependent ones define advantageous variants.

In particular, a suspension and traction system is disclosed for a vehicle equipped with a frame and a propulsive element through rolling on the ground (e.g. a wheel or a crawler) adapted to move the vehicle relative to the ground, comprising:

two rotary electric motors, which
are mounted to impart in the same direction an angular torque to the propulsive element in order to propel the vehicle on the ground,
are controllable independently of each other and
each comprise a stator and a rotor; wherein
the two rotors
are coupled to the propulsive element for transferring to it rotary motion through a transmission shaft, and
have a common rotation axis which is fixed relative to the vehicle's frame; and
the stators are
controllable to rotate about the respective rotor independently of each other (preferably one in clockwise direction and the other in counter-clockwise direction, i.e. with opposite angular directions), and
rigidly connected substantially at a same point, external to the motors, on which there can be exerted a thrust determined by the coordinated angular displacement of the stators about the respective rotors;
a transmission for transmitting the thrust generated on said point to the propulsive element.

Rotor is commonly used in the art to indicate the part rotating compared to the stator, which is instead the stationary part of an electric motor. According to the invention, however, both the rotor and the stator can move, although the rotor is the part that rotates the most because it provides rotary motion to the propulsive element. The rotor rotates with the necessary RPM to transmit kinetic energy to the propulsive element, the stator moves angularly if and when it is necessary to transmit said thrust on said point. Therefore, by rotor or stator here it is meant in general two parts of the electric motor which, after being energized by electric power, can move relatively with rotary motion. The commonly used definition, however, is useful for identifying in a known motor the electrical parts corresponding to rotor or stator as defined above, which are exploitable interchangeably.

By moving the stators about the common rotation axis of the rotors there is produced a force on this point, exploitable to modify the suspension, e.g. to vary the distance between said point and the propulsive element.

The general principle is that expressed in FIG. 2 of WO2015155670, here included as a reference and to it we refer back. The two electric motors are controlled both to transfer torque to the propulsive element and to regulate the height or distance (e.g. with respect to the ground or to the propulsive element) of the frame.

Note that, to produce a force at said point, it is also possible:
to move only one stator about the common rotation axis of the rotors; and/or
to move the two stators in the same angular direction about the common rotation axis of the rotors.

In these cases said point would rotate also or only about the X axis.

With the configuration defined above, it is possible not only to equip the idle wheels of a vehicle with an electric motorization but also to equip it with an integrated suspension.

Being the stators movable angularly with respect to the respective rotor, one can adjust their angular position around the rotors (and also with respect to the rotation axis of the rotors), e.g. through control of the torque impressed by a stator on its rotor. Adjusting the position of each stator translates into an adjustment of the position or height of said point, and therefore of the frame with respect to the propulsive element. In fact when the thrust generated on said point is transferred to the propulsive element, by reaction the frame moves away from the propulsive element.

Other important advantages of the system are that it allows equipping the vehicle with active suspensions, able to adapt the attitude thereof to the road and driving conditions, and that it can easily be integrated into most common suspension standards thereby allowing installation thereof both on new or pre-existing vehicles.

Another advantage is that the electric motors are separated from the propulsive element through the shaft, therefore stresses picked-up by the propulsive element do not unload on them. This effect is further improved if the transmission shaft comprises at least two segments connected to each other by a joint (e.g. a Cardan joint), and the rotation axis of the propulsive element is offset with respect to the rotation axis of the rotors. This allows placing the electric motors in points being more protected and/or easily coupled to the on-board electronics.

The electric motors may be separated from the propulsive element also through a different and/or more complex kinematics comprising a shaft.

Another advantage is that, at the starting or acceleration phase of the vehicle, the system can achieve a surprising dynamic effect. By controlling the electric motors so that, at the same time, the rotors impart rotary torque to the propulsive element and the stators move to generate on the propulsive element a force directed to the ground, the initial adhesion on the ground of the propulsive element is greatly improved. Therefore the vehicle can accelerate without the propulsive element sliding or skidding.

The same can happen during braking, where the electric motors can be controlled so that the stators move to generate on the propulsive element a force directed to the ground. Thus adherence of the vehicle during braking is increased.

In sum, with the aforementioned control it is possible to generate a force which, with the vehicle being stationary or in motion or under acceleration or braking, pushes the propulsive element not only tangentially but also orthogonally to the ground. The same phenomenon naturally occurs in very fast predatory felines, like the cheetah, which accelerates by pushing the rear legs not only backwards but also to the ground.

Another advantage of the system is the possibility of housing on the propulsion element a safety or parking disc brake, because the actuating members are external to the propulsive element.

The system also works when the propulsive element is stationary, thanks to the reaction forces imparted by the stators on the (steady) rotors.

Preferably the rotors are coupled to the frame by means of a rotary (e.g. ball or roller) bearing mounted to maintain their rotation axis fixed with respect to the frame.

The transmission to transmit the thrust generated on said point to the propulsive element may have many embodiments.

The transmission can be structured in such a way that the thrust generates preferably also a displacement of said point, which can be exploited to move the propulsive element through ropes or chains with appropriate return means. In another embodiment, the transmission comprises a fluid, whose compression is obtained by the generated thrust. The pressure increase to move the propulsive element, e.g. through a hydraulic piston.

The transmission to transmit the thrust is preferably structured so as to reverse the direction of the thrust generated on said point in order to direct it towards the propulsive element. For this purpose, too, and for constructive simplicity, preferably the said transmission comprises a lever pivoted on the frame, the lever comprising an application point for said generated force and an application point of force transmission towards the propulsive element, so that when said generated force moves the application point the lever moves the point of force transmission.

In particular, the lever comprises an oscillation axis which is fixed with respect to the frame, so that the lever is oscillating (e.g. as a rocker arm) with respect to the frame. Preferably the oscillation axis of the lever is intermediate to said application point for said generated force and to said point of force transmission towards the propulsive element. In this way the lever is able to reverse the displacement direction of the application point thereby facilitating the force transmission towards the propulsive element.

In particular, the lever is connected to the stators through two respective rigid arms, wherein each rigid arm has a point or end connected to a stator and a point or end connected to the lever.

In particular, the oscillation axis of the lever is substantially orthogonal to a vertical plane passing through said transmission shaft and/or through the rotation axis of the rotors.

In particular, the propulsive element is connected to the lever by means of a rigid arm.

A method is also proposed for varying the distance of a vehicle's frame from a ground-rolling propulsive element of its, wherein on the vehicle there are coaxially mounted two rotary electric motors, each equipped with a rotor and a stator, to impart by the two rotors an angular torque to the propulsive element in the same direction by means of a transmission shaft, the method comprising the steps of fixing the common rotation axis of the rotors relative to the vehicle's frame;

rigidly connecting the stators substantially at a same point, external to the motors;

rotating each stator about the respective rotor to exert a thrust on said point; and transmitting the generated thrust on said point to the propulsive element.

A method is also proposed for varying the distance of a vehicle's frame from a ground-rolling propulsive element of its, wherein on the vehicle there are coaxially mounted two rotary electric motors, each equipped with a rotor and a stator, to impart by the two rotors an angular torque in the same direction to the propulsive element by means of a transmission shaft, the rotation axis of the rotors being in common to them and fixed relative to the vehicle's frame;

the stators being substantially rigidly connected at one same point, external to the motors;

the method comprising the steps of rotating each stator about the respective rotor to exert a thrust on said point; and transmitting the thrust generated on said point to the propulsive element.

The variants described here for the system are also variants for the steps of the methods, and for the sake of brevity they will not be repeated. The same hold for the advantages of the methods.

Preferably in said methods there is the further step of controlling the electric motors so that the rotors exert a rotary torque on the propulsive element and at the same time the stators exert a force on the propulsive element to push it towards the ground.

The advantages of the invention will be clearer from the following description of a preferred embodiment of suspension and traction system, referring to the attached drawing in which FIG. 1 shows a principle diagram with components illustrated as in use.

The illustrated system MC is used to set a propulsive element, in the form of a wheel, into rotation. The wheel, by rolling on a terrain T, moves an associated vehicle (not shown). The system MC is e.g. replicated on all the wheels of the vehicle.

The system MC comprises two identical rotary electric motors 12, 14 which by means of a shaft 90 are able to rotate a wheel 92.

The two electric motors 12, 14 are formed by a respective stator 12s, 14s and a respective rotor 12r, 14r.

The rotors 12r, 14r are coaxial and have a common rotation axis indicated with X. The X axis is fixed relative to the vehicle's frame, e.g. by mounting the rotors 12r, 14r and/or the shaft 90 on a ball bearing (not shown) having a ring integral with the frame.

Each stator 12s, 14s is connected to a respective rigid arm 22, 24, and the arms 22, 24 are connected to a common point P external to the electric motors 12, 14.

The point P belongs or is connected to the end of a lever 40 which is oscillating, approximately at its center, around a axis Y fixed with respect to the frame of the vehicle. The other end of lever 40 (point Q) is connected to a hub 94 of the wheel 92 by a rigid arm 26.

The rotation of the rotors 12r, 14r about the X axis sets into rotation the wheel 92 about its rotation axis W.

By controlling the power supply of the electric motors 12, 14 (i.e. by giving more or less power than that required by the wheel 92) it is possible to move at the same time the stators 12s, 14s about the X axis, one clockwise and the other counter-clockwise.

E.g. it is possible to achieve that the arms 22, 24 are raised and push upwards the point P (in this case the point P moves away from the X axis). The lever 40 then rotates about the Y axis and moves the point Q downwards. It follows that the arm 26 pushes the hub 94 downwards and towards the ground, thereby obtaining, among other things, a variation of the distance between the axes W and X, in the example being parallel. In the example, the Y axis is orthogonal to an imaginary vertical plane passing through X (and/or W).

An upward movement of the hub 94 can be achieved by reversing all the motions described for the previous case (the point P approaches the axis X).

Note that the rotary torque applied to the wheel 92 by the rotors 12r, 14r and the force imparted on the wheel 92 towards the ground by the stators 12s, 14s are independently controllable quantities. So it is e.g. possible, during an acceleration phase, to push more the wheel 92 towards the ground to increase its grip.

The electrical power supply of the motors 12, 14 may be obtained, for example. by means of inverters or electronic power stages of known topology. An electronic control unit will take care to properly control the inverters or the electronic power stages so as to control the rotation regime of the wheel 92 and the height of the point P and Q.

The system MC is open to many variations and variables.

The electric motors 12, 14 need not be necessarily equal,

On the shaft 90 it is preferable to mount at least an articulated joint 96, e.g. a Cardan joint, to allow or facilitate the offset of the axes W and X and/or a different orientation of the axis W.

Each stator 12s, 14s may be connected to the point P also by different means from the arms 22, 24, and the point P does not necessarily represent a geometric point, being able to also be—for mechanical requirements—an extended element to which the stators 12s, 14s are connected at slightly spaced points.

The lever 40 may be oscillating at a point other than its center, and the Y axis fixed with respect to the frame may be obtained e.g. by simple pivoting.

Also the arrangement of the points Q and P on the lever 40 may vary, as well as the means for transferring the generated force from point Q to the wheel 92 by moving the stators 12s, 14s.

It is preferable to fit a mechanical (e.g. helical) or gas spring in parallel to the arm 26, between the wheel 92 and the frame, to compensate the weight of the frame.

The invention claimed is:

1. Suspension and traction system for a vehicle equipped with
    a frame and
    a propulsive element through rolling on the ground adapted to move the vehicle relative to the ground, comprising:
    two rotary electric motors, which
        are mounted to impart in the same direction an angular torque to the propulsive element in order to propel the vehicle on the ground,
        are controllable independently of each other and
        each comprise a stator and a rotor; wherein
    the two rotors
        are coupled to the propulsive element for transferring to it rotary motion through a transmission shaft, and
        have a common rotation axis which is fixed relative to the vehicle's frame; and
    the stators are
        controllable to rotate about the respective rotor independently of each other, and
        rigidly connected substantially to a same point, external to the motors, on which there can be exerted a thrust determined by a coordinated angular displacement of the stators about the respective rotors;
    a transmission for transmitting the thrust generated on said point to the propulsive element,
    wherein said shaft comprises at least two segments connected together by an articulation joint.

2. System according to claim 1, wherein the transmission is structured so that the thrust generates a displacement of said point.

3. System according to claim 2, wherein the transmission for transmitting the thrust is structured to reverse the direction of the thrust generated on said point to direct it towards the propulsive element.

4. System according to claim 3, wherein the transmission comprises
    a lever pivoted on the frame,
    the lever comprising an application point for said generated thrust and a force transmission point towards the propulsive element so that when the generated thrust moves the application point the lever moves the force transmission point.

5. System according to claim 4, wherein the lever comprises an oscillation axis which is fixed relative to the frame.

6. System as claimed in claim 5, wherein the lever's oscillation axis is intermediate to said application point for said generated thrust and to said force transmission point towards the propulsion element.

7. System according to claim 6, wherein the lever is connected to the stators of the two rotary electric motors via two respective rigid arms, wherein each rigid arm has a point or end respectively connected to one of a said stators and a point or end connected to the lever.

8. System according to claim 6, wherein the propulsive element is connected to the lever by means of a rigid arm.

9. System according to claim 5, wherein the lever is connected to the stators of the two rotary electric motors via two respective rigid arms, wherein each rigid arm has a point or end respectively connected to one of a said stators and a point or end connected to the lever.

10. System according to claim 5, wherein the propulsive element is connected to the lever by means of a rigid arm.

11. System according to claim 4, wherein the lever is connected to the stators of the two rotary electric motors via two respective rigid arms, wherein each rigid arm has a point or end respectively connected to one of a said stators and a point or end connected to the lever.

12. System according to claim 11, wherein the propulsive element is connected to the lever by means of a rigid arm.

13. System according to claim 4, wherein the propulsive element is connected to the lever by means of a rigid arm.

14. System according to claim 1, wherein the transmission is structured so that the thrust generates a displacement of said point.

* * * * *